(12) United States Patent
Eggert et al.

(10) Patent No.: US 10,397,413 B2
(45) Date of Patent: Aug. 27, 2019

(54) METHOD FOR CARRYING OUT A PRINTING OPERATION ON AN INKJET PRINTING MACHINE

(71) Applicant: HEIDELBERGER DRUCMASCHI8NEN AG, Heidelberg (DE)

(72) Inventors: Sebastian Eggert, Kiehl (DE); Helmut Siegeritz, Kronshagen (DE); Stefan Bollmann, Rellingen (DE); Nikolaus Pfeiffer, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/925,962

(22) Filed: Mar. 20, 2018

(65) Prior Publication Data

US 2018/0278758 A1 Sep. 27, 2018

(30) Foreign Application Priority Data

Mar. 22, 2017 (DE) .......... 10 2017 204 779

(51) Int. Cl.
*H04N 1/00* (2006.01)
*G06F 3/12* (2006.01)
*H04N 1/60* (2006.01)

(52) U.S. Cl.
CPC ....... *H04N 1/00087* (2013.01); *G06F 3/1219* (2013.01); *H04N 1/00023* (2013.01);
(Continued)

(58) Field of Classification Search
CPC .......... H04N 1/00087; G06F 3/1219
See application file for complete search history.

(56) References Cited

U.S. PATENT DOCUMENTS 5,416,613 A * 5/1995 Rolleston .......... H04N 1/00002
356/243.5
9,007,657 B2 4/2015 Luttmer
(Continued)

FOREIGN PATENT DOCUMENTS

| DE | 102010060950 A1 | 6/2012 |
| DE | 102016201245 A1 | 8/2017 |
| EP | 1388806 A1 | 2/2004 |

*Primary Examiner* — Ibrahim Siddo
(74) *Attorney, Agent, or Firm* — Laurence A. Greenberg; Werner H. Stemer; Ralph E. Locher (57) ABSTRACT

A method for printing on an inkjet printing machine including color space transformation between target and process color spaces using a computer, includes calibrating the machine by printing and colorimetrically measuring a process color space test chart for printing in the target color space including printing-operation-related limitations in the applied ink amount. The generated measured values correspond to sampling points in the measured target color space. The sampling points are interpolated to define further sampling points. The color space transformation uses sampling points in the target color space and input values from the chart in the process color space corresponding to sampling points in the target color space. The physical variable of ink drop volume is directly used for ink application limitations and input values in the process color space. The calibration of the machine is adapted and the printing operation is carried out.

10 Claims, 8 Drawing Sheets

(52) U.S. Cl.
CPC ......... *H04N 1/00031* (2013.01); *H04N 1/605* (2013.01); *H04N 1/6008* (2013.01); *H04N 1/6041* (2013.01)

(56) References Cited

U.S. PATENT DOCUMENTS

| | | |
|---|---|---|
| 2002/0122208 A1* | 9/2002 | Siegeritz .................. H04N 1/54 358/2.1 |
| 2007/0146740 A1 | 6/2007 | Yoshida |
| 2010/0092081 A1 | 4/2010 | Sakurai |
| 2010/0253698 A1 | 10/2010 | Chang et al. |
| 2011/0235126 A1 | 9/2011 | Miyamoto |
| 2012/0224199 A1 | 9/2012 | Fukuda et al. |
| 2017/0217163 A1 | 8/2017 | Trachanas et al. |

\* cited by examiner

METHOD FOR CARRYING OUT A PRINTING OPERATION ON AN INKJET PRINTING MACHINE

CROSS-REFERENCE TO RELATED APPLICATION

This application claims the benefit, under 35 U.S.C. § 119, of German Patent Application DE 10 2017 204 779.8, filed Mar. 22, 2017; the prior application is herewith incorporated by reference in its entirety.

BACKGROUND OF THE INVENTION

Field of the Invention

The present invention relates to a method for carrying out a printing operation on an inkjet printing machine by direct ink control through the ink drop volume.

The technical field of the invention is the field of digital printing.

To date, inkjet printing has relied on the methods and processes known from traditional lithographic offset printing, including the test charts that are used in that field. In that context, a test chart that has test patches for the process colors used in the printing operation to be carried out on the printing machine is selected. The process colors usually are CMYK plus optionally one or more additional colors in various combinations with one another and at various coverage values such as 10%, 20%, 30% up to 100% area coverage. Once printed, those varying combinations of process colors result in the colors reproducible by the printing machine that is used in the process in the target color space. Thus, the so-called process color space is the color space of the process colors that are used in the printing machine, i.e. CMYK plus potential spot colors, whereas in most cases the target color space is the CIELAB color space. That is due to the specific color management processes. As a first step, they include transforming a digitally available print image that is to be generated in the printing operation on the machine and is available in the RGB color space into a standardized color space in a first color space transformation by using an input profile. That color space is generally referred to as an XYZ color space. A special form of that color space is the specifically standardized CIELAB color space, which will herein be abbreviated as LAB color space. That standard color space may be used to make an accurate description of which color values are to be created in which locations of the print image to be generated. Thus, in that respect, the LAB color space is the target color space. However, since the printing machine cannot use print colors of the Lab color space but uses CMYK process colors plus spot colors instead, another color space transformation is required in the color management process to define the CMYK color combinations plus optional spot colors required to attain the required LAB color values. For that purpose, a so-called input profile, which is generated by printing and measuring the aforementioned test chart, is used to implement a further color space transformation from the target color space to the process color space. Then that test chart is printed and measured by using color measurement devices that measure the generated color values in the target color space. The measured values or points of the color measurement devices correspond to specific sampling points in the target color space. Due to the systematic structure of the test chart with the individual combinations of the process colors, those sampling points may then be allocated to corresponding sampling points in the process color space. In that way, a color space transformation from the target color space to the process color space may be carried out. Using the input and output profiles that have been generated in that way, the target print image, which was originally available in digital form in the RGB color space, may be generated in the process color space through the intermediate step of a transformation into the target color space and the printing machine may be profiled in the course of the color management process.

In traditional lithographic offset printing, limitations of the application of ink to the print image are mostly indicated by a maximum acceptable total area coverage TAC. TAC refers to the maximum acceptable total of percentages of the applied printing inks such as C, M, Y, K, etc. The TAC value factors in the so-called "drying" behavior of the printed sheets. "Drying" in that case mainly refers mostly to an oxidative process or to the absorption/penetration of the ink by/into the paper. That prevents the print sheets from sticking together in the stack or from getting too deformed and it also prevents ink from smearing.

In inkjet printing, if water-based inks are used, that corresponds to drying in the true sense of the word. For inks that are cured by UV light, it is important for the applied UV light to be able to cure the ink all through. In any case, the total amount of ink applied to the printing material, referred to as ink volume per surface area, is important. It is indicated, for instance, in picoliters per pixel. In contrast to offset printing inks, inkjet printing inks do not form a layer of constant thickness on the printing material. That means that a simple evaluation of the relative area coverage of the printing material is not expedient.

If one applies the percentages commonly used in lithographic offset printing to an inkjet system, the defined restrictions in the form of the TAC values in percent in general do not fit the actual process behavior. The percentages are in particular influenced by a scaling of the individual color proportions to the maximum value acceptable in the respective individual channel, also referred to as the ink limit, by the calibration, for instance aiming at the provision of defined density gradations, and by the screening process.

In order to solve that problem, U.S. Pat. No. 9,007,657 B2 discloses a method for color space transformation between two color spaces including the steps of establishing so-called "excess values" for mixed colors, making a further calculation in area coverage values, and applying an approximate solution for the color space transformation while directly using the area coverage values. The disclosed method generates an adapted test chart, which, however, continues to have "unprintable" color patches while at the same time parts of the required color space are not covered. Moreover, the color space transformation is carried out in a non-linear color space. There is no direct representation of the physical conditions and no consideration of the calibration of the printing machine that is used. In addition, no ink-specific limits are possible.

Thus, the prior art lacks a process for creating a test chart for color management purposes that is adapted to inkjet printing as well as any consistent use of the physical variable of the ink drop volume. In addition, no optimal inkjet printing machine calibration process adapted to inkjet printing is known in the art.

SUMMARY OF THE INVENTION

It is accordingly an object of the invention to provide a method for color management in an inkjet printing machine, which overcomes the hereinafore-mentioned disadvantages of the heretofore-known methods of this general type and which is optimally adapted to the specific requirements of inkjet printing.

With the foregoing and other objects in view there is provided, in accordance with the invention, a method for carrying out a printing operation on an inkjet printing machine including a color space transformation between a target color space and a process color space by using a computer, wherein to calibrate the inkjet printing machine a process color space test chart suitable for the printing operation and including printing-operation-related ink application limitations is printed and colorimetrically measured in the target color space, the measured values generated in this way correspond to sampling points in the measured target color space, an interpolation is made between the sampling points to define further sampling points, and the color space transformation is carried out by using the sampling points in the target color space and the input values in the process color space that correspond to the sampling points in the target color space, in which the input values are known form the test chart. The method includes directly using the physical variable of the ink drop volume for the printing-operation-related ink application limitations as well as for the input values in the process color space, adapting the calibration of the inkjet printing machine in this respect, and carrying out the printing operation based thereon.

The starting point of the method of the invention is the fundamental color management process known from the prior art. The method of the invention adapts this process to the specific requirements of inkjet printing. In order to be able to implement the inkjet printing operation in a predictable way, it is expedient to actuate the printing machine not with the conventional percentages but directly with the ink volume values such as picoliters per pixel. By computer-assisted software simulation or measurement, it is possible to determine the relationship between the input values and the output values in picoliters per pixel for every channel by weighting ink volumes of monochrome color gradations. If one applies the corresponding inverse functions to the input values, one gets a printing system that outputs precisely those values in picoliters per pixel that have been input. In this context it is irrelevant whether the printing machine internally works with specific machine data or conventional percentages; the conversion to an ink-volume-based system is easily possible in any case by applying a one-dimensional correction function in every color channel. Even a calibration of the printing operation that is implemented internally only modifies the shape of this correction function and might theoretically be dispensed with if it does not contribute to avoiding heavily distorted curves.

If images in common formats such as PDF or TIFF are represented, one may by all means interpret the device-specific color values (such as CMYK, etc.) as volume-related values. In the case of an 8-bit encoding, it may be necessary for every color channel to use a suitable scaling factor that assigns the maximum value (255) to the respective maximum value in picoliters/pixel. Such factors may for instance be noted as special entries in a PDF file. They enable an efficient use of the value ranges.

Naturally only those images that refer to the device-specific color space of the inkjet process are interpreted in a volume-based way. The most common images that are used by customers as original input data are images that have been separated for standard offset printing. They are treated in the known way.

Advantageous and thus preferred further developments of the method will become apparent from the associated dependent claims and from the description together with the associated drawings.

A preferred development in this context is that the target color space is a Lab color space and the process color space is a CMYK color space or a process space containing the CMYK color space as a subset. In most cases the target color space is a Lab color space, whereas the process color space is a CMYK color space plus potential spot colors. The latter enhance the standard CMYK color space in accordance with the spot colors that are used. These may be CMYKOGV instead of just CMYK, OGV meaning orange, green, violet. However, there are other target color space embodiments that are usually based on the XYZ color space. The Lab color space is merely a very common standardized representative of the XYZ color space.

Another preferred development in this context is that in the calibration process of the inkjet printing machine, the sampling points for every used color channel are calculated to be evenly distributed, a characteristic calibration curve is created on the basis of the implemented computer-assisted color space transformation, and that characteristic calibration curve is used for the printing operation on the inkjet printing machine. The calibration step is mainly formed of printing and measuring the test charts and calculating evenly distributed sampling points. When the test chart is printed and measured, sampling points are generated in accordance with the setting of the measurement points. A color management task is to distribute these sampling points as evenly as possible in order for the color space transformation that is carried out in this way preferably to evenly include all areas of the two color spaces. This may be achieved by setting the measurement points, i.e. the locations in which measurements are taken on the test chart, in a corresponding way. Since the sampling points that are generated in this way are not sufficient for color space transformation purposes, missing sampling points between two already existing sampling points are generally interpolated. This method is matched with the setting of the measurement points for a first-time creation of the sampling points in such a way that the sampling points that are created are generated to be as evenly distributed as possible. The sampling points that are generated to be evenly distributed in this way are used to create a characteristic calibration curve that allows the control unit of the inkjet printing machine by a specific use of process colors to attain precisely those color values in the target color space that are required in the current print image.

An added preferred development in this context is that the even distribution of the sampling points of every color channel is achieved by manipulating the ink-drop-based input values in the process color space by using at least two predefined curves with predistorted input values for every color channel, wherein for every predefined curve a test chart including input values that have been predistorted in a corresponding way is printed, and wherein that test form that has optimized resultant measured values is used as a suitable test chart for the color space transformation. In order to reduce the effort for generating evenly distributed sampling points in every color channel as much as possible, one option is to digitally predistort the input values that are provided in picoliters per pixel. The pre-distortion creates a wider range of variation of used combinations of process colors, which corresponds to the sampling points in the process color space, therefore generating a wider range of generated values in the target color space, thus resulting in a greater variation of the sampling points. The predistorted curve with the corresponding combinations of process color values—which then result in measured values and sampling points, respectively—that are closest to the desired color values in the target color space is then included in the test chart as a process color combination.

An additional preferred development in this context is that if a distortion of the input values is done for all color channels independently of one another, firstly for every one of the at least two predefined curves for a color channel, a test chart is printed, with the test chart having input values that have been predistorted in a corresponding way, the computer then simulates all remaining combinations of the predistorted input values for the further color channels, and based thereon a resultant suitable test chart with the optimized test patches of all color channels is used for color space transformation. In the simplest example, identical curves would be used for all color channels. However, if one wants to distort the predefined curves for all color channels independently of one another, it would be inefficient for all of the at least four color channels to print an inevitably very high number of color channel combinations in the form of the test chart. In this case, due to the independence of the channels from one another, not just 5 times 4 pages would have to be printed but $5^4$ pages instead. In order to reduce this unacceptably high number of test chart pages, one does not print all possible combinations of the various predistortions for the individual color channels; instead, one prints all predistortions for one color channel only once. The results are then simulated on the computer for the combinations with the other color channels. Based on these results, a new test chart is created that contains the combinations of the best distortions in the individual color channels.

Another preferred development in this context is that the even distribution of the sampling points of every color channel are iteratively determined along one-dimensional axes in the multidimensional target and process color spaces, resulting in a multi-dimensional even distribution of the test patches of the suitable test chart. Since the desired even distribution of the sampling points for every color channel is likewise desired multidimensionally in a color space that may be formed of more than three dimensions, it is advantageous to implement an even distribution of the sampling points along one-dimensional axes that point through the color space along the respective color of the color channel in question. If this is done for all color channels, the result is a multidimensional even distribution of the test patches in the test chart in accordance with the sampling points in the process color space and thus also in the target color space.

An added preferred development in this context is that the printing-operation-related limitations in terms of ink application are determined in a profiling process wherein a limitation of the ink drop volumes to a maximum ink application value is carried out by using physical prespecifications in terms of the drying behavior of the ink, whereby a suitable modified test chart is created that has limited test patches that are printable by the inkjet printing machine in the process color space and are within the maximum ink application value. In the course of the method of the invention a profiling process is carried out. This profiling process aims at adapting the test chart to be used for color transformation purposes to the requirements of the inkjet printing operation. The main aspect in this context is the calculation of the maximum ink drop volumes, which result from physical specifications such as the drying behavior of the ink. These maximum values for ink drop volumes may be used to adapt the test chart in a corresponding way, namely in such a way that the individual test patches of the test chart are limited to the maximum values for the ink drop volumes. The test chart thus only contains test patches that are within the resultant maximum ink application value. This test chart with the limited test patches is then used to carry out the corresponding measurement and calculation of the sampling points and thus the color space transformation.

An additional preferred development in this context is that to create the suitable modified test chart having limited test patches, those test patches that exceed the maximum ink application value are modified to this maximum ink application value, are not printed, or are printed and then ignored. If the test chart resulting from the calibration does in fact still contain test patches that exceed the maximum ink application value, these test patches are modified to comply with the maximum ink application value. Other options would be not to print those patches and to leave them white or to print them with the ink application values that are too high, i.e. with too much ink drop volume, and then to ignore them when creating the sampling points for the color space transformation.

Another preferred development in this context is that an ICC profile for color space transformation between the target color space and a process color space for the printing operation is created by using the determined sampling points and the suitable modified test chart with limited test patches. In most cases the output profile required for color management is a so-called ICC profile. In accordance with the method of the invention, in the course of the profiling using the suitable test charts that have been created and then modified in accordance with the maximum ink application value, these modified suitable test charts are printed and measured in a corresponding way and on the basis of the sampling points that have been created in this way an output profile for color space transformation in the form of an ICC profile is created. This ICC profile is then used in the color management process of the inkjet printing machine.

A concomitant preferred development in this context is that the calibration in terms of the calculation of the sampling point distribution in the test chart is carried out inversely, directly factoring in the measured data of the calibration into the distribution of the test patches of the test chart. By immediately factoring in the measured data of the calibration in the distribution of the test patches of the test chart one obtains optimum sampling points for a profile calculation. This allows the creation of volume-based profiles on machines calibrated in a volume-based way. In a case in which predefined curves with predistorted input values are used, sets of curves that have been calculated using SCTV (spot color tone value) would be suitable.

Other features which are considered as characteristic for the invention are set forth in the appended claims.

Although the invention is illustrated and described herein as embodied in a method for carrying out a printing operation on an inkjet printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as such as well as further developments of the invention that are advantageous in structural and/or functional terms will be described in more detail below with reference to the associated drawings and based on at least one preferred exemplary embodiment.

DETAILED DESCRIPTION OF THE INVENTION

Figure 1:
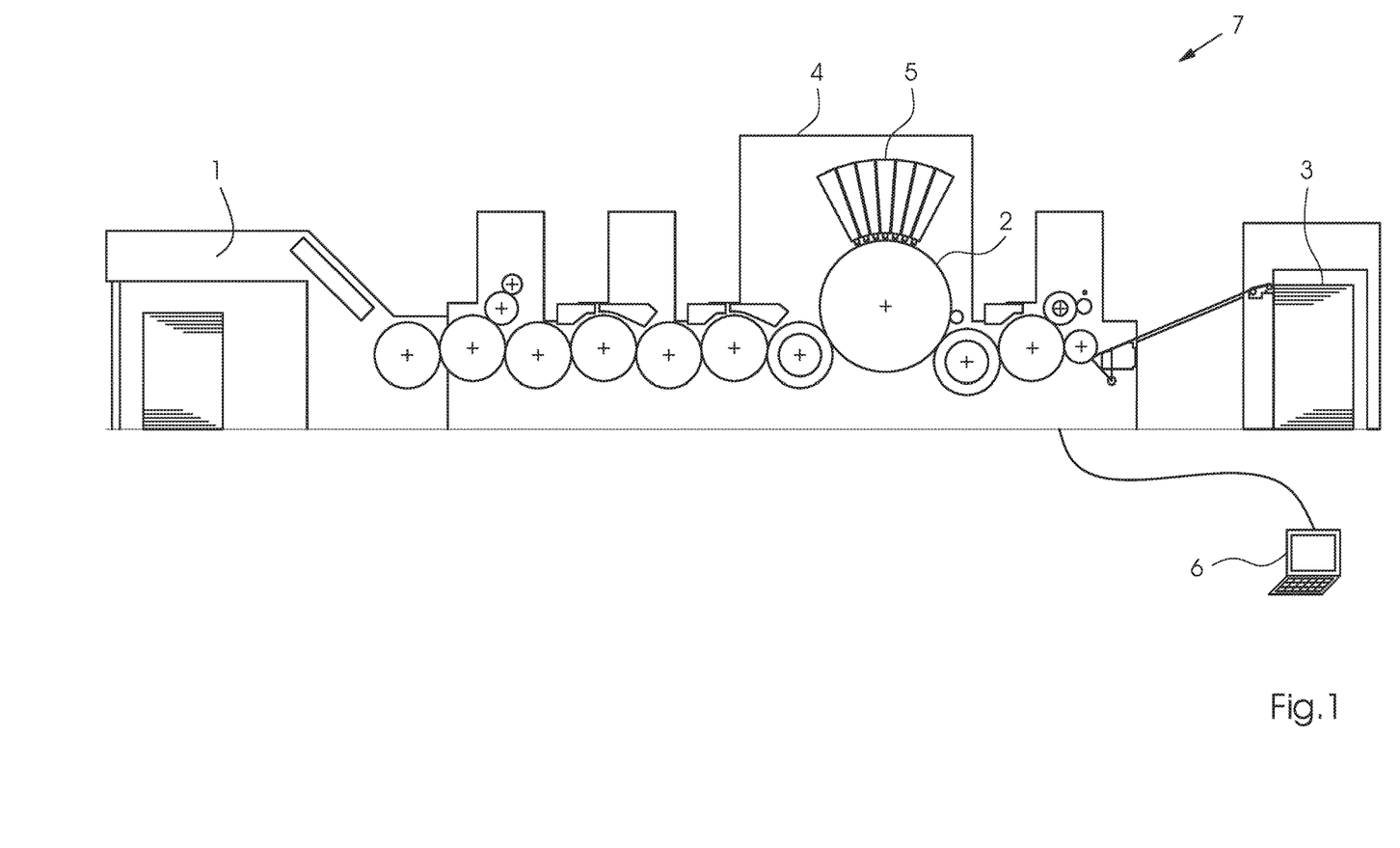
FIG. 1 is a diagrammatic, longitudinal-sectional view of an example of the structure of a sheet-fed inkjet printing machine.

Referring now in detail to the figures of the drawings, in which mutually corresponding elements have the same reference symbols, and first, particularly, to FIG. 1 thereof, it is seen that the field of application of the preferred exemplary embodiment is an inkjet printing machine 7. FIG. 1 shows an example of the fundamental structure of such a machine 7, including a feeder 1 for feeding a printing substrate 2 to a printing unit 4, where it receives an image printed by print heads 5, and a delivery 3. The printing machine is a sheet-fed inkjet printing machine 7 controlled by a control unit or computer 6.

Figure 2:
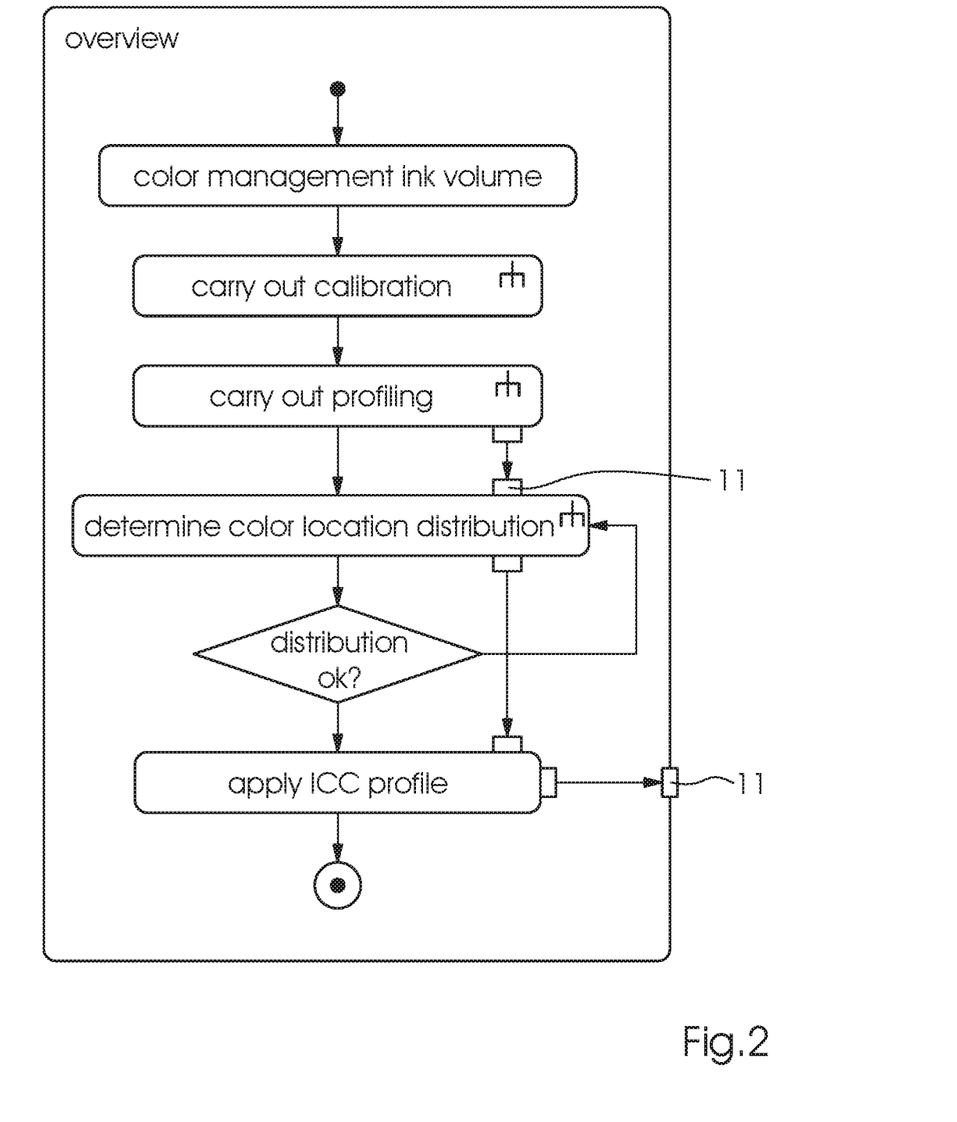
FIG. 2 is a flow chart of the method of the invention.
Figure 4:
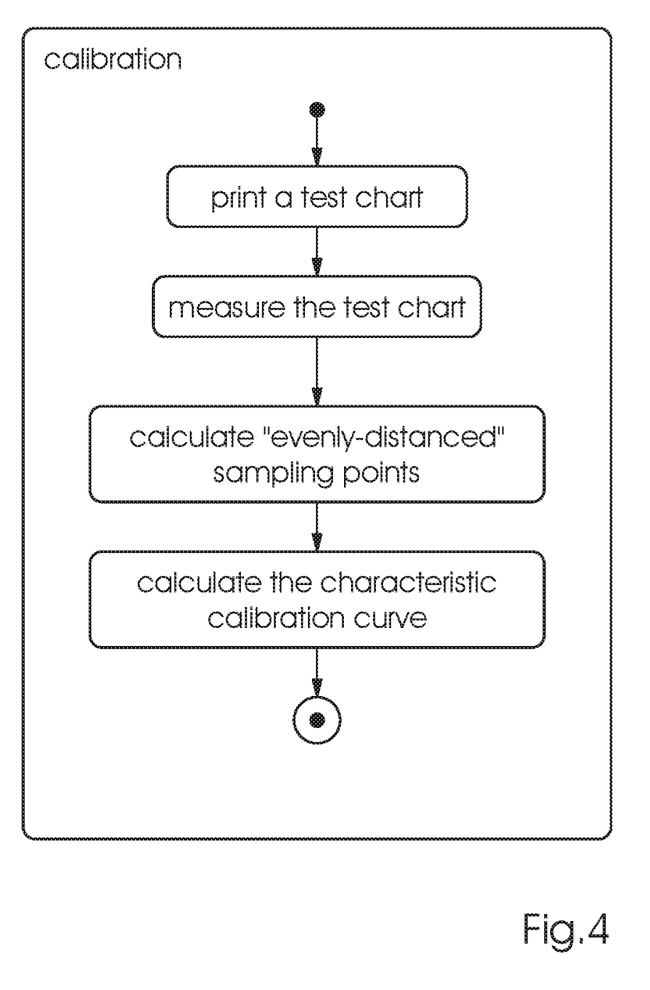
FIG. 4 is a flow chart of the calibration process.

The basic work flow of the method of the invention is shown in the flow chart of FIG. 2. The method includes four steps. The first step is to calibrate the inkjet printing machine 7 that is used. This process is shown in more detail in FIG. 4. The calibration ends with the creation of a characteristic calibration curve for the printing machine 7.

Figure 5:
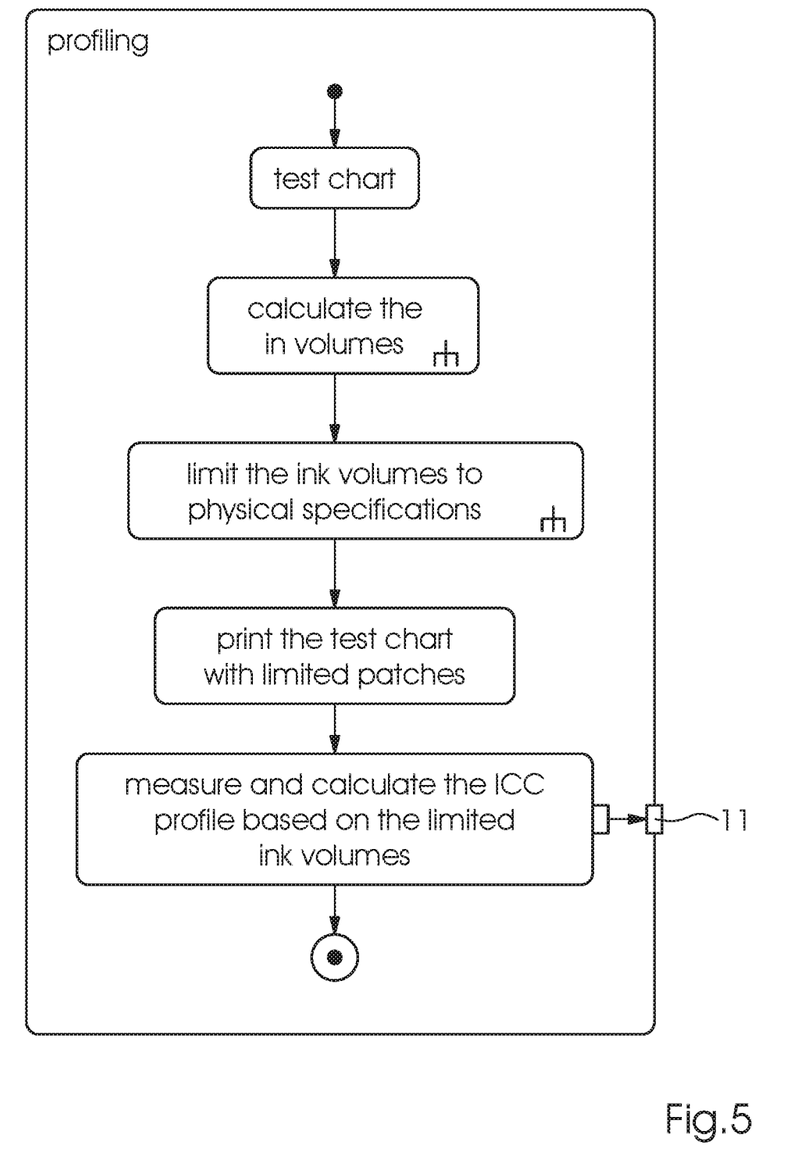
FIG. 5 is a flow chart of the profiling process.
Figure 6:
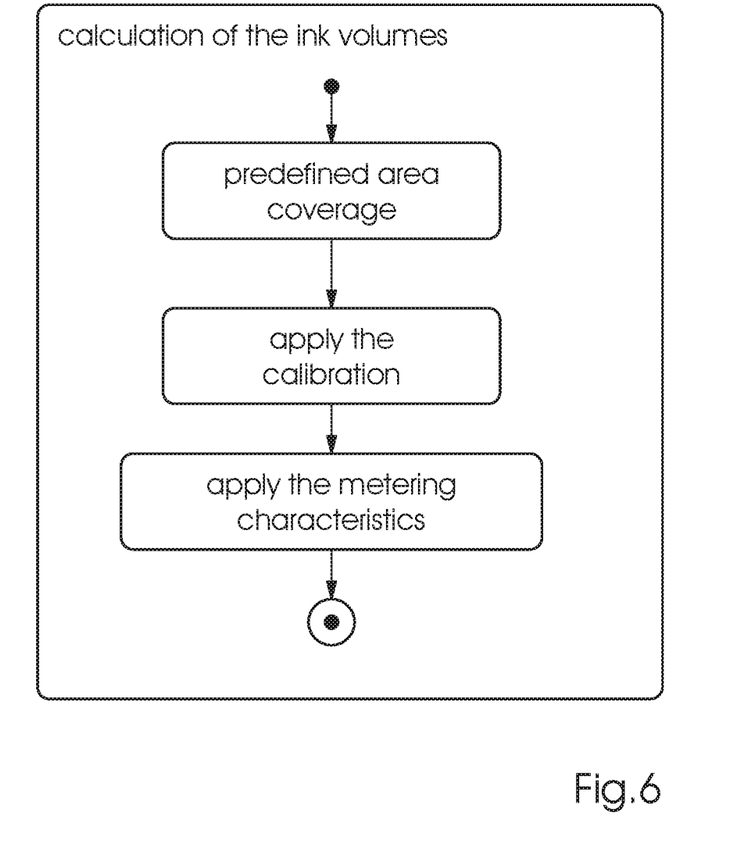
FIG. 6 is a flow chart of the ink drop volume calculation process.
Figure 7:
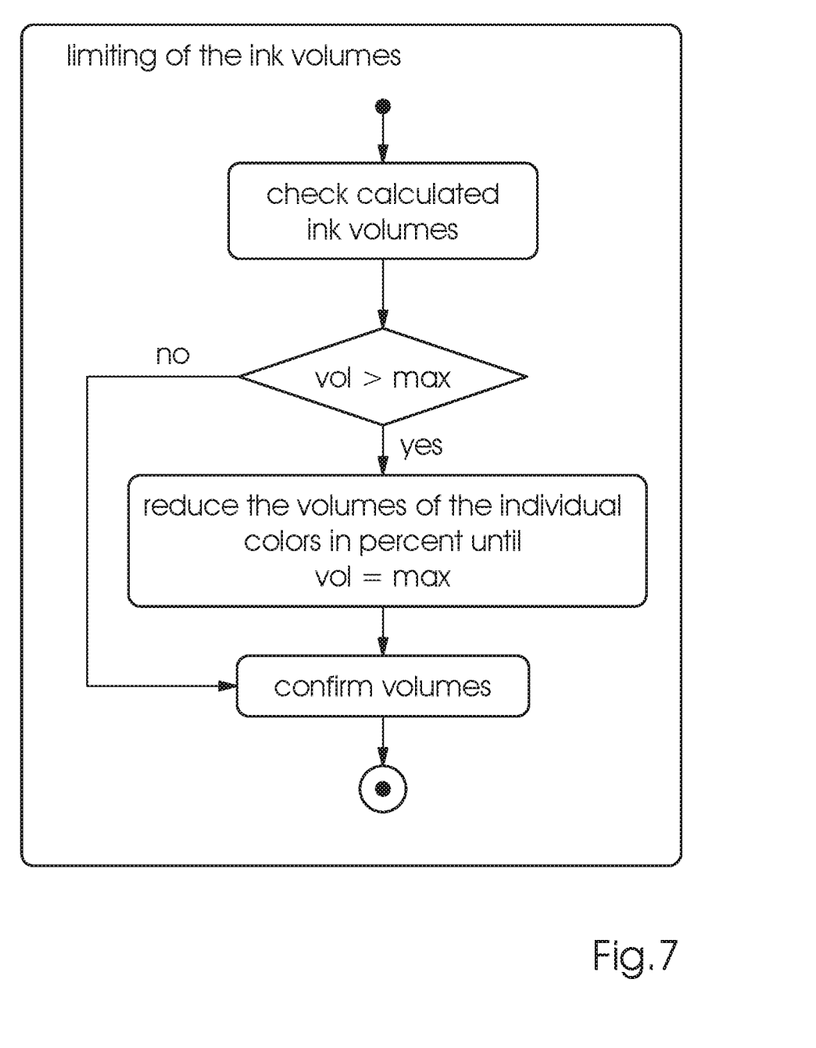
FIG. 7 is a flow chart of limiting the ink drop volume.

Another important step is the subsequent profiling to adapt the test chart required for color transformation. This process is shown in more detail in FIG. 5. The most important aspects of the profiling process are a calculation of the corresponding ink drop volumes, also referred to as ink volumes, which is schematically shown in FIG. 6, and, based on physical specifications, limiting the calculated ink drop volumes to a maximum value. This is shown schematically in FIG. 7.

Figure 8:
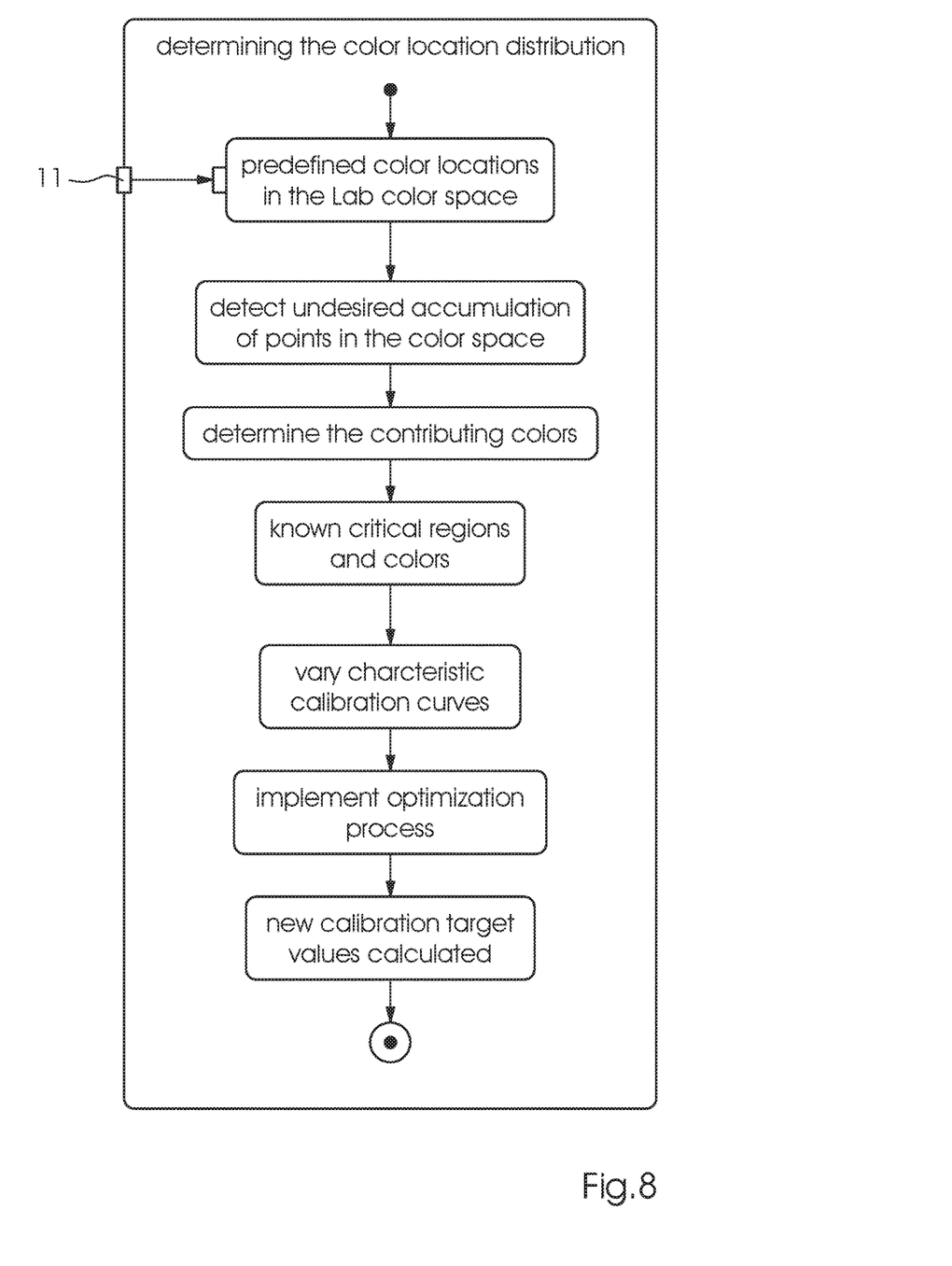
FIG. 8 is a flow chart of the determination of the color location distribution.

The next step of the method of the invention is to determine the color location distribution, which corrects the calibration values created in the course of the calibration process and supplements the profiling. This step with its individual sequences is shown in FIG. 8.

In a last step, ICC profiles 11 that have been created in this way are then used in the color space transformation in accordance with the invention in the course of a color management process adapted to the inkjet printing process.

The following paragraphs describe further preferred embodiments.

In offset printing, there is a number of defined test charts such as the ones in accordance with ISO 12647-2 (IT8.7/4) or the ECI 2002 test chart. Such test charts include a plurality of color patches with combinations of the process colors in different grades given in percentages. Most test charts do not include any limitation of the maximum total ink volume that may be applied. It is assumed that exceeding limits that will later have to be respected is tolerable if it only occurs in a few color patches that do not form continuous areas.

The gradation of the color channel values is empirical and leads to a usable sampling of the process space in common applications even if it is anything but optimal. The latter fact becomes clear when one compares printed test charts on coated and uncoated paper.

In lithographic offset printing, subsequently printing multiple variations of larger test charts takes a lot of effort due to the creation of printing plates and the set-up times of the machine 7. In inkjet printing, however, this is not a problem; it is not even necessary to stop the machine 7 for the process.

Figure 3:
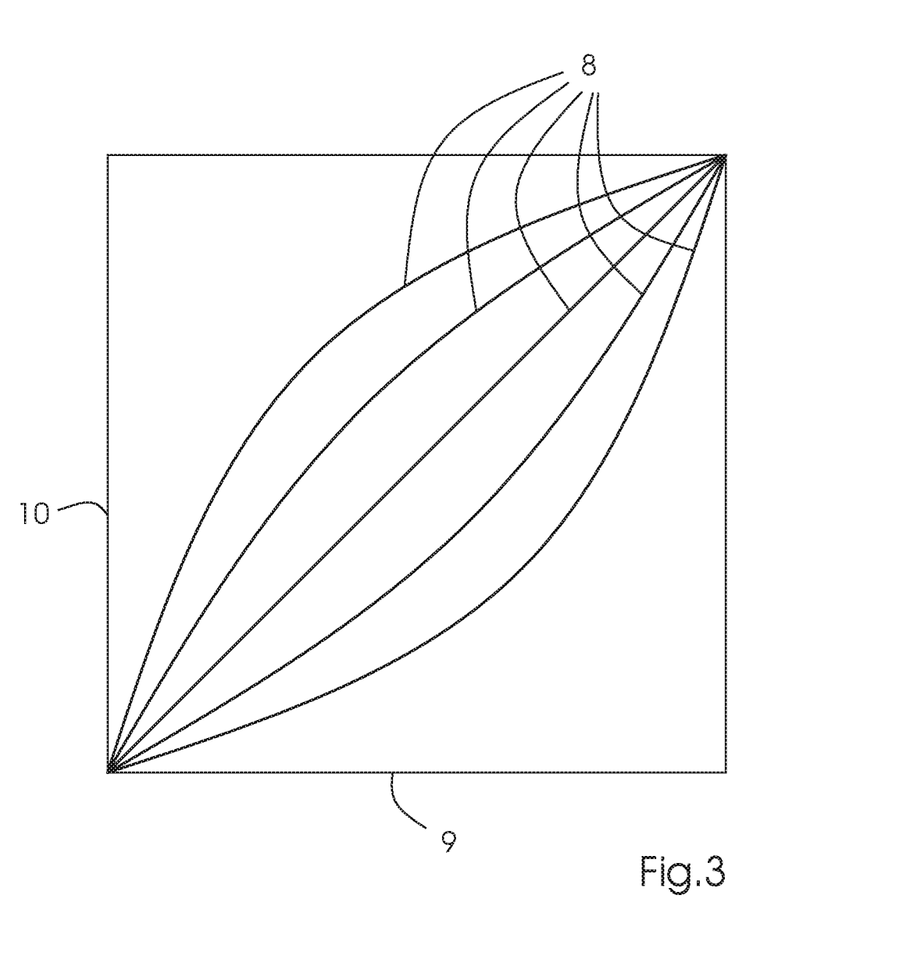
FIG. 3 is a graph illustrating an example of multiple predistorted curves of input values in pL/P.

In general, an even-distance distribution in the individual channels of a test chart does not provide a particularly favorable sampling of the process color space even when printing is done with a system based on ink volumes. However, both in terms of costs and time, it is very efficient to print not only a single test chart but a number of variations. In particular, in this context it is possible to predistort the applied input values between 0 and the acceptable maximum value for every channel—in picoliters 9 per pixel 10—in their respective ranges using defined curves. Examples of curves 8 for predistortion are shown in FIG. 3.

Such a series of variations may easily be implemented by a PDF file having multiple pages. If the printed test charts contain color gradations in the individual color channels, for instance in steps of 10% of the maximum value, a suitable distribution may immediately be indicated in a series of varying distortions by visual evaluation. The sampling of the process space that is obtained in this way is at least as good as the one obtained in offset printing by using a defined, unchangeable test chart, and no additional time for color measurements is required.

In the illustrated example with 5 curves, only five pages would have to be printed in the case of the simplest application with identical curves for all color channels in a CMYK printing operation. One of the pages contains the most favorable test chart. If one wants to vary all channels independently of one another, one expediently does not print $5^4=625$ pages but initially only five as in the process described above. Then the next step is immediately to generate a new test chart with the combination of the best distortions in the individual channels by using software. This test chart is subsequently printed.

It is possible for individual color patches to exceed the total volume limitation in the total of all print color proportions. If the test charts are not delivered in a larger stack, this may be tolerated. Alternatively, all such color patches may be left white in the test chart files or may be limited in such a way that the limitations are no longer exceeded.

In this context, a specific preferred embodiment of the method is the inverse application of calibrations on the calculation of the sampling point distribution on the test chart. In this case, the measured calibration data are directly factored in the distribution of the test chart. As a result, one obtains optimum sampling points for a profile calculation. Thus, volume-based profiles may be created on machines calibrated in a volume-based way. Potential sets of curves would be sets of curves calculated by SCTV.

In a further preferred embodiment of the method, optimum one-dimensional distributions may be established in an iterative way. These one-dimensional distributions also allow an optimum multi-dimensional distribution of the measurement chart patches.

In this process, the test chart is of vital importance in the method of the invention. When a suitable test chart has been printed on a volume-based printing system, it may be used to calculate ICC profiles 11 in a way analogous with the ones used in lithographic offset printing.

On the device-dependent side, the test chart is distinguished by the combination of print color proportions in picoliters per pixel in the included color patches. The values that occur in the individual case are a function of the maximum acceptable amount of ink per color channel or printing unit on one hand and the respective predistortion 8 that has been applied. If the test chart was derived from the test chart in accordance with ISO 12647-2, for instance in CMYK, which includes regular grids placed across the process space, the modified test chart likewise includes regular grids. The only differences are that instead of the percentages, there are picoliters 9 per pixel 10 and the gradations in the individual channels may vary. Basically, such test charts also occur in lithographic offset printing, namely when calibration and profiling are to be established together with a printing plate. In this process, the calibration curves established from gradation wedges are inversely applied to the print color proportions of the originally unchangeably defined test chart.

Now the total of the print color proportions in picoliters 9 per pixel 10 may be factored in just like the maximum total area coverage TAC in percent is factored in as a limitation during profile calculation in lithographic offset printing.

The colorimetric measurement of the printed test chart occurs in just the same way as with test charts in lithographic offset printing. The only thing to do is to add the currently used values in picoliters 9 per pixel 10 instead of the conventional percentages as print color proportions.

The ICC profiles calculated from the test charts basically represent the transformations required for the separation, e.g. Lab to CMYK, and for the simulation, e.g. CMYK to Lab. The difference between volume-based inkjet printing and offset profiles is that the device-specific side, i.e. the CMYK process color space, uses values in picoliters 9 per pixel 10, scaled if necessary to the acceptable range for the color channels with suitable scaling factors, in a way analogous to potentially required scaling in PDF files as described above.

The following is a summary list of reference numerals and the corresponding structure used in the above description of the invention. List of

REFERENCE SYMBOLS

1 feeder
2 printing substrate
3 delivery
4 inkjet printing unit
5 inkjet print head
6 computer
7 inkjet printing machine
8 predefined, predistorted curves of input values in pL/pixel
9 x-axis—color value in pL
10 y-axis—selected pixel
11 ICC profile

The invention claimed is:

1. A method for carrying out a printing operation on an inkjet printing machine including a color space transformation between a target color space and a process color space by using a computer, the method comprising the following steps:

calibrating the inkjet printing machine by printing and colorimetrically measuring a process color space test chart suitable for the printing operation in the target color space including printing-operation-related limitations in an amount of applied ink;

using the test chart to generate measured values corresponding to sampling points in a measured target color space;

interpolating between the sampling points to define further sampling points;

carrying out the color space transformation by using the sampling points in the target color space and input values known form the test chart in the process color space corresponding to the sampling points in the target color space;

directly using a physical variable of an ink drop volume for printing-operation-related ink application limitations as well as for the input values in the process color space;

adapting the calibration of the inkjet printing machine based on the ink application limitations and the input values in the process color space; and carrying out the printing operation based on the adapted calibration.

2. The method according to claim 1, which further comprises providing the target color space as a Lab color space and providing the process color space as a CMYK color space or a process space including the CMYK color space as a subset.

3. The method according to claim 1, which further comprises carrying out the calibration process of the inkjet printing machine by calculating the sampling points for every used color channel to be evenly distributed, creating a characteristic calibration curve based on the implemented computer-assisted color space transformation, and using the characteristic calibration curve for the printing operation on the inkjet printing machine.

4. The method according to claim 3, which further comprises achieving the even distribution of the sampling points of every color channel by manipulating the ink-drop-based input values in the process color space by using at least two predefined curves with predistorted input values for every color channel, printing a test chart including input values having been predistorted in a corresponding way for every predefined curve, and using the test chart having optimized resultant measured values as a suitable test chart for the color space transformation.

5. The method according to claim 4, which further comprises upon carrying out a distortion of the input values for all color channels independently of one another, firstly printing a test chart for every one of the at least two predefined curves for a color channel, providing the test chart with input values having been predistorted in a corresponding way, then using the computer to simulate all remaining combinations of the predistorted input values for the further color channels, and using a resultant suitable test chart with the optimized test patches of all color channels for color space transformation based on the simulation.

6. The method according to claim 3, which further comprises iteratively determining the even distribution of the sampling points of every color channel along one-dimensional axes in the multidimensional target and process color spaces, resulting in a multi-dimensional even distribution of the test patches of the suitable test chart.

7. The method according to claim 1, which further comprises determining the printing-operation-related limitations in terms of ink application in a profiling process with a limitation of the ink drop volumes to a maximum ink application value carried out by using physical prespecifications in terms of a drying behavior of the ink, and creating a suitable modified test chart having only limited test patches being printable by the inkjet printing machine in the process color space and being within the maximum ink application value.

8. The method according to claim 7, which further comprises creating the suitable modified test chart having limited test patches by not printing or printing and then ignoring those test patches exceeding the maximum ink application value being modified to the maximum ink application value.

9. The method according to claim 7, which further comprises creating an ICC profile for color space transformation between the target color space and a process color space for the printing operation by using the determined sampling points and the suitable modified test chart having limited test patches.

10. The method according to claim 1, which further comprises carrying out the calibration in terms of a calculation of a sampling point distribution in the test chart inversely, directly factoring in measured data of the calibration into the distribution of test patches of the test chart.

* * * * *